United States Patent [19]

Medney

[11] Patent Number: 4,473,420
[45] Date of Patent: Sep. 25, 1984

[54] METHOD AND APPARATUS FOR APPLYING HOOP WINDINGS TO A CYLINDRICAL MEMBER

[75] Inventor: Jonas Medney, Oceanside, N.Y.

[73] Assignee: Koch Engineering Company, Inc., Wichita, Kans.

[21] Appl. No.: 427,287

[22] Filed: Sep. 29, 1982

Related U.S. Application Data

[63] Continuation-in-part of Ser. No. 170,903, Jul. 21, 1980, abandoned.

[51] Int. Cl.³ .............................................. B65H 81/00
[52] U.S. Cl. .................................... 156/172; 156/175; 156/428; 156/432
[58] Field of Search ............... 156/432, 431, 430, 429, 156/428, 391, 392, 175, 172, 169, 173, 404; 242/7.21, 7.22, 7.23

[56] References Cited

U.S. PATENT DOCUMENTS

| | | | |
|---|---|---|---|
| 2,758,366 | 8/1956 | Voetelink | 156/432 |
| 3,336,176 | 8/1967 | Medney | 156/431 |
| 3,429,758 | 2/1969 | Young | 156/173 |
| 3,458,146 | 7/1969 | Warner | 156/175 |
| 3,577,294 | 5/1971 | David | 156/173 |
| 3,616,072 | 10/1971 | Bostrom | 156/244.13 |
| 3,769,127 | 10/1973 | Goldsworthy et al. | 156/172 |
| 4,028,164 | 6/1977 | Montagut | 156/173 |

FOREIGN PATENT DOCUMENTS 361354  12/1972  U.S.S.R. ............................ 156/425

*Primary Examiner*—Michael W. Ball
*Attorney, Agent, or Firm*—Posnack, Roberts, Cohen & Spiecens

[57] ABSTRACT

An apparatus and method are provided for winding hoop windings onto a cylindrical member which may be a fiberglass tube or a mandrel. Two sequential stations are provided, each of which includes a rotatable drum and a rotatable winding member. Each of these is separately drivable by respective pulleys. The separately driven drum can be wound with filament or filament may be stripped therefrom according to requirement. The associated winding member consists of two funnels between which are positioned a plurality of pulleys, such that the filament can be unwound from the associated drum and applied to the mandrel or tube.

34 Claims, 4 Drawing Figures

METHOD AND APPARATUS FOR APPLYING HOOP WINDINGS TO A CYLINDRICAL MEMBER

OTHER APPLICATIONS

This application is a continuation-in-part of my earlier filed U.S. application Ser. No. 170,903, filed July 21, 1980.

BACKGROUND

Various types of apparatus are known for the continuous production of tubes or pipes and the like and for the application of reinforcing filament or the like thereto. Some such devices and apparatus are to be found in U.S. Pat. Nos. 3,336,176; 3,429,758; 3,458,146; 3,769,127; 3,616,072; and 4,028,164.

J. Montagut in U.S. Pat. No. 4,028,164 discloses a process and apparatus for forming an elongated hollow body from fibre-reinforced synthetic resins. This patent described that a plurality of resin impregnated support fibres are positioned over and extend longitudinally along a rotating mandrel. These fibres are fed from a station having a plurality of spools thereon with the feed station rotating synchronously with the mandrel. The longitudinal support fibres form a fibrous substructure which rotates with the mandrel. A plurality of fibrous elements, which are also resin impregnated, are wrapped around the fibrous substructure to form a hollow body, which is gripped by a clamping device for pulling the same and thereby displaying the same longitudinally along the mandrel.

In U.S. Pat. No. 3,616,072 R. Bostrom discloses a machine for the continuous manufacture of reinforced plastic pipe by winding rovings soaked in uncured or partially cured resin about a tubular plastic extrusion that advances axially over a mandrel. The rovings are supplied from cakes each of which is automatically replaced when it runs out by a spare cake. Fresh cakes may be automatically supplied from a stock of cakes and separate stations may be provided.

W. Goldsworthy et al disclose in U.S. Pat. No. 3,769,127 a device for making filament reinforced tubular products in continuous manner. The device includes a series of filament spools and filament from these spools is impregnated with resin and passed around a fixed mandrel to form longitudinal strands. The mandrel extends through a plurality of helical filament wrap devices which are designed to apply opposing helically wound strands of filament upon the longitudinal strands to constitute hoop windings thereon. The mandrel further extends through circumferential filament wrap devices for laying outermost surface circumferential strands in opposite directions with respect to each other.

In my earlier U.S. Pat. No. 3,336,176 I disclose a method for producing a continuous length of reinforced thermosetting plastic conduit comprising forming a synthetic resin liner over a mandrel, providing a lubricating film between the mandrel and the liner so that the liner may be advanced freely in the direction of the axis of the mandrel and applying continuous lengths of filament longitudinally and helically on the liner to form a laminate structure. I further disclose passing the laminate structure through a vacuum chamber wherein the pressure is reduced to remove interstitial air from the laminate structure, which is then passed through a chamber containing resin under positive pressure in order to impregnate the filament structure with resin. The resin is then cured and the cured resin impregnated laminate structure is then removed from the mandrel.

None of the aforegoing patents and techniques or apparatus provide for hoop winding a cylindrical member in the advantageous manner to be disclosed hereinbelow.

FIELD OF INVENTION

It is an object of the invention to provide an improved method and apparatus for the application of hoop windings to a cylindrical member, possibly having been previously reinforced with longitudinally applied fibres or filaments.

It is another object of the invention to provide for the improved continuity of manufacture of products of the above-indicated type by permitting the selective winding and unwinding of filament supply drums from which filaments are drawn for application to a cylindrical member, such as as mandrel or plastic tube.

Yet another object of the invention is to provide for the even application of filaments by the sensing of physical conditions or the like in the filament being applied.

In achieving the above and other objects of the invention, there is provided a method of winding hoop or helical windings on a cylindrical member, such as a mandrel or a plastic tube, which method comprises passing the cylindrical member through at least one station consisting of a rotatable drum and a rotatable winding member arranged in sequence. The drum and the winding member are separately rotated and the method further comprises selectively winding filament on to the drum and removing the thusly wound filament from the drum and passing this filament through the winding member to be applied to the cylindrical member.

In accordance with a feature of the invention, the tension or speed of the filament or other such characteristic is sensed and the speed of winding of the filament onto the cylindrical member is controlled in accordance with such characteristic.

In further accordance with the invention, filament is axially applied along the periphery of the cylindrical member before winding the hoop or helical windings thereover. The cylindrical member is axially displaced in a preferred embodiment in opposite directions to form two hoop layers thereupon.

Still further in accordance with a preferred embodiment of the invention, the cylindrical member is passed through two stations, each consisting of a rotatable drum and winding member, and the filament is wound onto one drum, while filament is unwound from the other drum and applied to the cylindrical member.

In further accordance with the invention, an apparatus is provided for winding hoop windings onto a cylindrical member, as aforesaid, said apparatus comprising a fixed base accommodating relative movement of the cylindrical member therethrough, a drum on the base to receive filament to be wound on the same, and a winding device on the base to guide filament from the drum onto the cylindrical member, said drum and winding device being separately drivable, whereby the drum can be selectively wound with or stripped of filament.

In yet further accordance with the invention, a second drum and winding device can be provided at a second station, whereby either station may be selectively operated while the other station is being replenished with suitable filament.

More particularly, the drum and winding device are coaxially rotatable about a cylindrical part comprised by the base and separate drives are provided preferably in the form of pulleys respectively mounted on the drum and winding device for the separate driving thereof.

As has been indicated generally hereinabove, a sensing device may be provided to sense the tension or speed of the filament or other such characteristic of the filament as it is being stripped from the drum and wound onto the cylindrical member. The sensing device may be used to control the speed of at least one of the driving devices for the drum or winding device, respectively, to minimize changes in speed or tension.

According to yet other features of the invention, the winding device may include funnels in positions to be specified in detail hereinafter for guiding filament off of the drum and into position for application to the cylindrical member. Pulleys may be provided intermediate the funnels to guide the filament between the same. In one preferred arrangement, the pulley on the winding device to drive the same is provided with at least one opening through which filament may be passed in moving between pulleys, which, as mentioned above, may be employed for guiding the filament between the funnels, which have also been mentioned above.

Yet other features of the invention find the driving being made possible by the utilization of relatively large sized ball bearings, which consist of a stationary part mounted on the aforementioned base and an outer ring supported by balls and constituting on the one hand the drum upon which filament is wound, or from which filament is removed, and on the other hand a support for the aforementioned pulleys and funnels. Also, it is possible to employ diametrally opposed sets of pulleys and funnels rotatable about the base means so that more than one filament may be applied at one time.

Other objects, features and advantages of the invention will be found in the following detailed description, as illustrated in the accompanying drawing.

DETAILED DESCRIPTION OF INVENTION

As has been mentioned hereinabove, this application is a continuation-in-part of my earlier filed U.S. application Ser. No. 170,903 filed July 21, 1980. The description and illustration of such earlier application are incorporated herein as though fully set forth.

Figure 1:
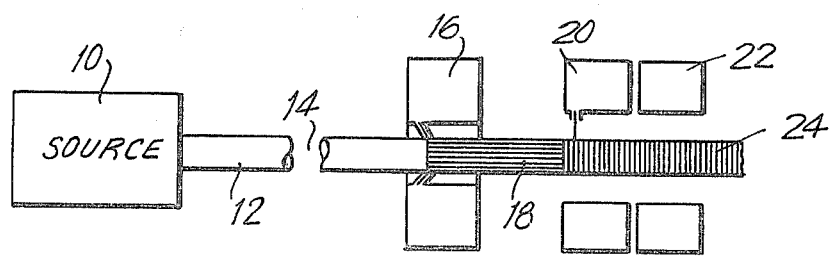
FIG. 1 diagrammatically illustrates the stations required for the application of longitudinal and hoop windings to an axially displaceable cylindrical member.

The diagrammatic illustration of FIG. 1 illustrates a source 10 from which exits either a longitudinally or axially displacable cylindrical member in the form of a solid or hollow mandrel, or from which exits an extruded plastic pipe or tube which may be formed, for example, of a resin or of fiberglass. In accordance with the invention, there will be applied to this cylindrical member longitudinally reinforcing filament and/or hoop windings in one or more layers. The cylindrical member is generally indicated at 12 and a portion is shown broken away at 14 to show that the length of this member depends upon circumstances which are not vital to a description of the preferred embodiment of the invention.

At 16 is indicated a station whereat are applied to the cylindrical member 12 a plurality of juxtaposed longitudinally or axially oriented filaments indicated at 18. The application of these longitudinally or axially oriented filaments is too well-known to warrant further discussion in this text and some methods for the application of these longitudinal filaments will be found in the aforementioned co-pending application or in the aforementioned prior art patents.

In accordance with the invention, a plurality of stations are provided which are independently and selectively operable. Two such stations are indicated at 20 and 22. The helical or hoop windings which are applied thereby are indicated at 24 and the details of one such station are illustrated in FIG. 2.

Figure 2:
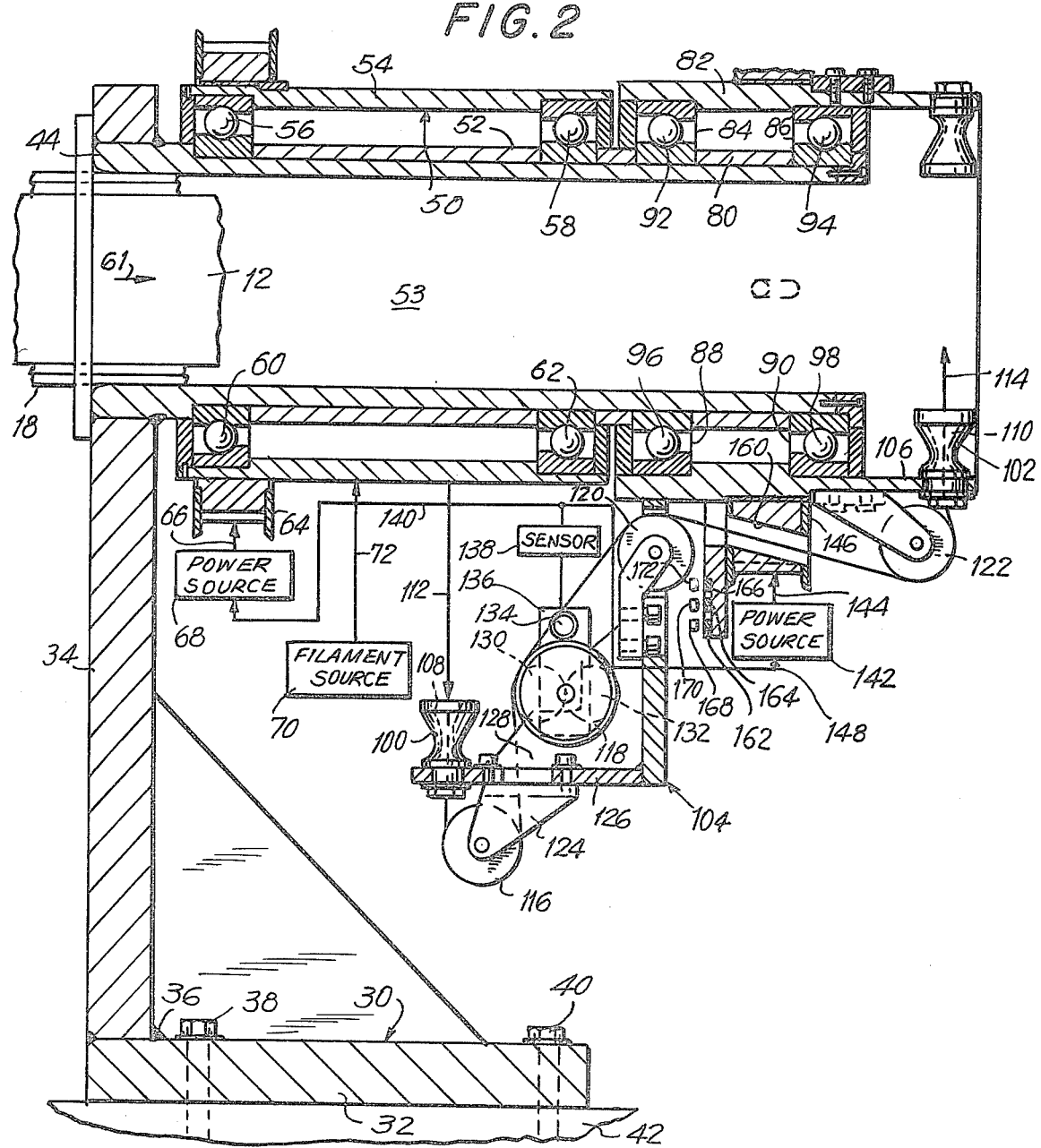
FIG. 2 illustrates a fragmentary view of a station as employed in FIG. 1 in which is provided a filament drum and a winding device.

FIG. 2 represents a preferred arrangement of details, part of which are shown diagrammatically, since the showing of the details of the diagrammatically shown portions will not be essential to an understanding of the invention. A portion of the details has been broken away and is not illustrated since they will be constituted essentially by a mirror-image of what has been shown in the drawing.

More particularly, a station in accordance with a preferred embodiment of the invention will consist of a base 30 having a horizontal portion 32 and a vertical portion 34 affixed thereto, such as by welding indicated generally, by way of example, at 36. The horizontal portion 32 may be fixed by members such as bolts 38 and 40 to a floor or other such supporting structure indicated generally at 42.

Mounted on the vertical member 34 is a cylindrical member 44 which accommodates the axial displacement therethrough of the cylindrical member 12, which has been mentioned hereinabove. It will be recalled that this cylindrical member 12 may be solid or hollow and may consist of a mandrel fabricated, for example, of aluminum or steel or the like, or, in the alternative, may be constituted by a plastic tube formed of resin or any other such material. The longitudinally applied fibres or filaments are indicated in FIG. 2 at 18 in order to relate to the longitudinal fibres referred to above relative to FIG. 1. The details of FIG. 2 are directed to showing how hoop windings or helical windings may be applied in accordance with the invention in such manner that one station is selectively being operated, while the other station is selectively being replenished with filament, which has been exhausted from the associated drum. Accordingly, it is to be understood that the invention provides a method of winding hoop windings or cylindrical windings on a cylindrical member which method comprises passing the cylindrical member through at least one rotatable drum and one rotatable winding member arranged in sequence, separately rotating the drum and winding member, and selectively winding filament onto the drum and removing the thusly wound filament from the drum and passing the filament through the winding member to be wound on the cylindrical member.

As will also be shown hereinbelow, the method of the invention comprises sensing the tension or speed of the filament or other such characteristic and controlling the speed of winding the filament being wound onto the cylindrical member in accordance with the measurements thus taken.

The drum of the station illustrated in FIG. 2 is generally indicated at 50. It consists of an inner ring or cylinder 52 fixedly mounted on the cylindrical part 44 and an outer ring 54 rotatable about the inner ring and supported thereupon by balls indicated, by way of example, at 56, 58, 60 and 62. The inner and outer rings 52 and 54 are concentric and the outer ring 54 is rotatable about the inner ring 52, which is fixed and is therefore rotatable about the cylindrical part 44, as well as about the cylindrical member 12. The member 12 is axially displaceable, as indicated by arrow 61, through the bore 53 in the cylindrical part 44. This direction of motion is reversible by means (not shown) whereby two or more layers of hoop windings may be applied to the cylindrical member 12.

In order to drive the ring 54 in rotation about the cylindrical member 12, there is provided a pulley indicated at 64. This pulley is concentric with and mounted on outer ring 54 and is shown by way of illustration only. It will be appreciated that other driving devices may be employed as, for example, a spocket and chain wheel type of driving device.

The belt or driving instrument through which the pulley 64 is operated, is indicated diagrammatically at 66 and the means for driving the belt 66 is indicated in the form of a power source 68, the details of which are not shown, since they would be well known to men of ordinary skill in the art involved. A filament source 70 is indicated diagrammatically with the filament 72 being also diagrammatically shown for application to the drum 50 and, more particularly, the outer ring 54 thereof. In accordance with the invention, the drum 50 is selectively employed. At one time or another filament may be removed from the drum for application to the cylindrical member 12 while, at another time filament may be wound onto or replenished to the drum 50, thereby making it available for subsequent use. In such manner, there is no need to interrupt the continuous winding of filament onto the cylindrical member 12, since there will always be a source of such filament available at one station or the other in a series of stations, such as has been discussed above relative to FIG. 1.

A second set of inner and outer rings is also employed in the illustrated station. The inner ring is indicated at 80 and the outer ring, which is concentric therewith and rotatable about the same, is indicated at 82. They are supported upon one another by means of ball bearing races, such as indicated generally at 84, 86, 88 and 90. Balls 92, 94, 96 and 98 are indicated, by way of example. Inner ring 80 is supported on cylindrical part 44 in fixed manner, whereas outer ring 82 is rotatable about the same, while constituting a support for the filament guiding elements to be discussed hereinbelow.

Two of these filament guiding members are indicated in the form of funnels 100 and 102. It will be understood that the mirror-image counterparts of these funnels are not shown in the drawing for the sake of convenience and simplification. Thus, these funnels, as well as the pulleys to be described hereinbelow, find their diametrally located counterparts in mirror-image on the diametrally opposite side of the rings 80 and 82.

Funnels 100 and 102 are supported by supports 104 and 106, respectively. Each is provided with a bore indicated at 108 and 110. Filament is indicated as passing from the drum 50 via path 112 to the funnel 100. Filament is also indicated as passing out of funnel 102 via path 114 for application helically onto the cylindrical member 12.

Between funnels 100 and 102 are a plurality of relatively small pulleys 116, 118, 120 and 122. These pulleys define the path along which the filament is guided between the aforesaid funnels for ultimate application to the mandrel or tube passing through the station. Pulley 116 is supported by bracket 124 on arm 126 of the support 104. Pulley 118 is supported by bracket 128 to receive the filament being guided outwardly by pulley 116. Pulley 118 is provided with dancing rollers 130 and 132. A further rotating member or wheel 134 is shown mounted on bracket 136, which cooperates with or forms a part of sensor 138 by means of which the tension or speed or other such characteristic of the filament is gauged. Changes in tension or speed or other such characteristic are converted in known manner into electrical signals, which are passed via line 140 to power source 68, which drives pulley 64. A second power source 142 is indicated which operates mechanically or otherwise via belt 144 or the equivalent upon pulley 146, which drives or rotates the outer ring 82 about inner ring 80. Sensor 138 may also pass signals via line 148 to the power source 142. Thereby the speed of driving of outer rings 54 and/or 82 can be controlled.

The reason for controlling the relative speeds of the various rings is to minimize the differences in speed or tension in the filament, which is being wound onto the cylindrical member. One reason why, by way of example, it may be necessary to control the relative speeds of the rotating rings or devices is that as the amount of layers of filament on the drum 50 is decreased by reason of application of the filament to the cylindrical member 12, the linear speed of the filament in conjunction with the decreasing diameter of the filament on the drum will cause a change in speed of rotation of the drum, which necessarily must be accommodated by appropriate control of power sources 68 and 142. This is achieved by sensor 138 and the signals developed therein.

The details of pulley 146 are to be noted in accordance with various features of the invention. Thus, there is provided an inclined opening 160 representing one of a plurality of such openings. This opening or bore presents a passage for the filament as it moves from pulley 120 to pulley 122 and then via funnel 102 into position for application to the cylindrical member 12.

Also to be noted are the commutator rings 162, 164 and 166. These are electrical commutator rings operatively associated with brushes diagrammatically indicated at 168, 170 and 172. These brushes are electrically associated with power source 142 in order to indicate to the power source 142 that the associated pulley 146 is being adequately driven for application of the filament to the cylindrical member.

With two such stations of the nature indicated hereinabove, it is possible to be loading one drum, while the other drum is being utilized for dispersing filament for application by the associated winding device to the mandrel or tube passing through the particular station. This affords a continuous operation, since it is not necessary to shut down the device, while subsequent sources of filament are being prepared for application in the above-indicated manner. Filament is manually stripped from the drum of the particular station involved at the commencement of operation and manually threaded through the various funnels and pulleys with one or two windings being manually applied about the cylindrical member until the filament is caught for automatic displacement onto and around the cylindrical member. Thereafter, the application of the filament in the form of hoop or helical windings is automatic and continuous without interruption.

Figure 3:
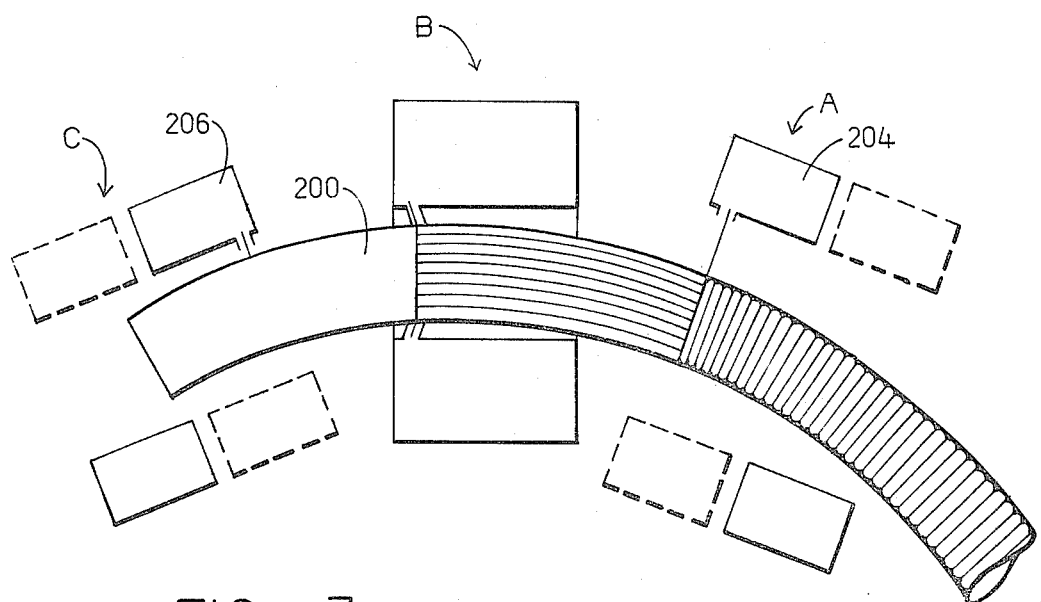
FIG. 3 diagrammatically illustrates the formation of an elbow in a first stage in accordance with the invention.

In FIG. 3 there is seen a tubular element 200 which can be a pipe or a mandrel which is advanced in the direction of the arrow 202 and in the course of which passes through hoop winding station A, longitudinal winding station B and hoop winding station C. The tubular element is first wound with hoop windings at station A and is then wound with longitudinal reinforcement filaments in station B and thereafter is wound with hoop windings at station C.

Two hoop winding systems 204 and 206 are respectively employed at stations A and C and these are operative in alternation in each system. These winding systems may substantially be as shown in FIG. 2.

Figure 4:
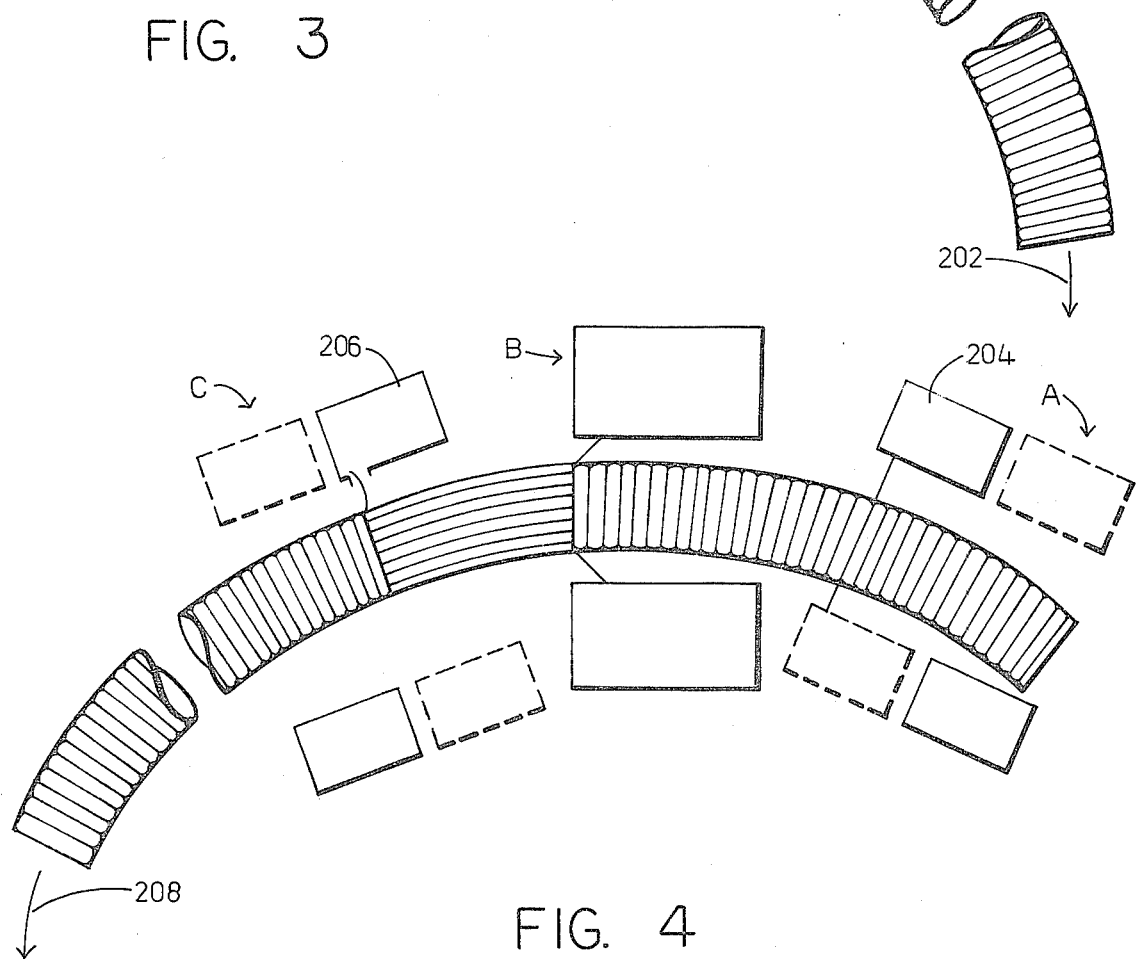
FIG. 4 is a view corresponding to FIG. 3 in a second stage.

After the entire pipe or mandrel 200 has been completely wound with longitudinal and hoop windings, the direction of movement of the member 200 is reversed in the direction of arrow 208 as shown in FIG. 4 and the member with the longitudinal filaments and hoop windings is then passed through the stations C, B, and A in this reverse order. Thus, there will be two hoop windings for each layer of longitudinal windings.

After the filament reinforcements have been placed on the tube or mandrel, resin can be applied thereto and subsequently cured to form the completed elbow.

There will now be obvious to those skilled in the art many modifications and variations of the structure set forth hereinabove. These modifications and variations of this structure, as well as the aforegoing method, will not depart from the scope of the invention, if defined by the following claims.

What is claimed is:

1. A method of winding hoop windings on a cylindrical member comprising passing the cylindrical member through at least one rotatable drum and one rotatable winding member arranged in sequence, separately rotating the drum and winding member, and selectively winding filament onto the drum and removing the thusly wound filament and passing the filament through the winding member to be wound on the cylindrical member.

2. A method as claimed in claim 1 comprising sensing the tension of the filament and controlling the speed of the winding of the filament being wound on the cylindrical member in accordance with said tension.

3. A method as claimed in claim 2 comprising layering filament axially along the periphery of the cylindrical member before winding the first said filament thereover.

4. A method as claimed in claim 3 comprising axially displacing the cylindrical member in opposite directions to form two hoop layers thereon.

5. A method as claimed in claim 4 comprising forming the cylindrical member as a mandrel.

6. A method as claimed in claim 2 comprising forming the cylindrical member as a fiberglass tube to which the filament is applied as a reinforcement.

7. A method as claimed in claim 1 comprising passing the cylindrical member through two sets of rotatable drum and winding members and winding filament on one drum, while unwinding filament from the other drum.

8. A method as claimed in claim 1 for continuously producing a reinforced pipe comprising advancing said cylindrical member in a longitudinal direction, feeding longitudinal reinforcement members onto the advancing said cylindrical member around the circumference thereof such that said reinforcement members advance with the said cylindrical member and extend axially thereof, passing the said cylindrical member with the longitudinal reinforcement members therein through a hoop winding station whereat said filament is wound around the advancing said cylindrical member to form hoop windings substantially at right angles to the longitudinal reinforcement members, positioning at said hoop winding station two hoop winders each comprising said rotatable drum and said rotatable winding member which are respectively rotatable around the advancing said cylindrical member to wind the filament therearound, supporting the hoop winders for axial displacement, between operative and retracted positions in alternation such that one winder is in operative position while the other is in retracted position to enable the winder in operative position to travel around the advancing said cylindrical member without interference while the winder in inoperative position is capable of being refilled with a reinforcement member for subsequent use, passing the said cylindrical member with the longitudinal reinforcement members and hoop windings thereon into a vacuum chamber and then directly into a resin chamber, and introducing resin under pressure into the resin chamber to inpregnate said longitudinal reinforcement members and hoop windings to form a pipe.

9. A method as claimed in claim 8 comprising winding a second layer of filament as hoop windings around the first layer of filament in a second hoop winding station such that two layers of hoop windings of filament are formed around said cylindrical member for said one layer of longitudinal reinforcement members.

10. A method as claimed in claim 9 wherein said longitudinal reinforcement members and hoop windings are made of fiberglass.

11. A method as claimed in claim 10 wherein said resin is a thermosetting resin.

12. A method as claimed in claim 8 comprising applying a weatherproofing outer layer around the impregnated hoop windings.

13. A method as claimed in claim 8 wherein the two hoop winders are operated alternately so that when one is winding the filament around the cylindrical member, the other is refilled and stands in readiness, for operation when the first winder becomes exhausted.

14. A method as claimed in claim 9 wherein to form an elbow the cylindrical member is of curved shape and is fed in one direction through a feed device for the longitudinal reinforcement members and then through one hoop winding station whereafter the thus wound pipe is fed in reverse direction through the other hoop winding station.

15. A method as claimed in claim 13 wherein the two hoop winding stations are disposed on opposite sides of the longitudinal winder.

16. A method as claimed in claim 8 wherein said tubular element is an extruded pipe which is advanced from an extruder to the station at which the longitudinal reinforcement members are fed onto the pipe, said reinforcement members being bonded to one another and to said extruded pipe by said resin such that the produced pipe is composed of said extruded pipe with the reinforcement members integrated therewith and bonded thereto by said resin to form an impervious outer coating for the produced pipe.

17. Apparatus for winding hoop windings on a cylindrical member, said apparatus comprising base means accommodating relative axial movement of the cylindrical member therethrough, drum means on the base means to receive filament to be wound on said drum means, and winding means on the base means to guide filament from the drum means onto the cylindrical member, said drum means and winding means being separately rotatable, whereby the drum means can be selectively wound with or stripped of filament.

18. Apparatus as claimed in claim 17 comprising a second drum means supported for being selectively rotatable whereby to be selectively wound with and stripped of filament.

19. Apparatus as claimed in claim 18 comprising a second winding means operatively associated with said second drum means and rotatable to strip filament therefrom and guide the filament onto said cylindrical member, said second drum and winding means being separately rotatable with respect to each other and with respect to the first said drum and winding means.

20. Apparatus as claimed in claim 17, wherein the drum and winding means are coaxially rotatable about said cylindrical member.

21. Apparatus as claimed in claim 20 comprising separate rotating means respectively on said drum and winding means for the separate driving thereof.

22. Apparatus as claimed in claim 21, wherein said base means includes a cylindrical section through which said cylindrical member can move.

23. Apparatus as claimed in claim 21 comprising first and second driving means to rotate said drum means and winding means respectively.

24. Apparatus as claimed in claim 23, wherein changes in tension tend to develop in filament being stripped from the drum means and wound by said winding means onto the cylindrical member, comprising sensing means to sense the tension in filament being stripped from the drum means and wound onto the cylindrical member, said sensing means controlling at least one of the driving means to minimize changes in said tension.

25. Apparatus as claimed in claim 22, wherein said winding means includes funnel means, juxtaposed to said cylindrical section but axially spaced therefrom for guiding the filament onto the cylindrical member.

26. Apparatus as claimed in claim 25, wherein said winding means includes a second funnel means suspended in radially spaced relation from said drum means.

27. Apparatus as claimed in claim 26 comprising first and second driving means to drive said drum means and winding means respectively.

28. Apparatus as claimed in claim 27 comprising pulley means to guide the filament from the first said funnel means to said second funnel means.

29. Apparatus as claimed in claim 28, wherein said winding means includes a cylindrical rotatable part and said second driving means includes a driving part concentrically mounted on said cylindrical part.

30. Apparatus as claimed in claim 29, wherein said pulley means includes first and second pulleys straddling said driving part, said driving part being provided with an opening through which filament can pass when moving from said first to said second pulley.

31. Apparatus as claimed in claim 30, wherein said driving part is a part of a ball bearing including a stationary part mounted on the base means.

32. Apparatus as claimed in claim 31, wherein said pulley means includes further pulleys between the first said funnel means and said first pulley.

33. Apparatus as claimed in claim 22, wherein said drum means includes a ball bearing including inner and outer concentric rings and balls between said rings, said inner ring being mounted on said cylindrical section.

34. Apparatus as claimed in claim 32 comprising diametrally opposed sets of said pulley and funnel means on said base means.

* * * * *